(12) United States Patent
Schatz (10) Patent No.: US 6,193,214 B1
(45) Date of Patent: Feb. 27, 2001

(54) SHUT-OFF OR THROTTLE VALVE WITH PIVOTAL FLAP

(75) Inventor: Oskar Schatz, Gauting (DE)

(73) Assignee: Schatz Thermo System GmbH, Erling-Andechs (DE)

( * ) Notice: Subject to any disclaimer, the term of this patent is extended or adjusted under 35 U.S.C. 154(b) by 0 days.

(21) Appl. No.: 09/164,979

(22) Filed: Oct. 1, 1998

Related U.S. Application Data (63) Continuation-in-part of application No. 08/737,433, filed on Sep. 10, 1996, now Pat. No. 5,975,128.

(51) Int. Cl.⁷ ................................................ F16K 1/22
(52) U.S. Cl. ........................................ 251/305; 123/323
(58) Field of Search ........................... 123/323; 251/305, 251/527

(56) References Cited

U.S. PATENT DOCUMENTS

| | | |
|---|---|---|
| 1,282,112 | 10/1918 | Oettinger . |
| 1,469,686 | 10/1923 | Petry . |
| 1,550,419 | 8/1925 | Beaurline . |
| 2,147,801 | 2/1939 | Scanlan . |
| 3,234,924 * | 2/1966 | May ..................................... 123/323 |
| 3,635,239 | 1/1972 | Farrer . |
| 4,176,690 | 12/1979 | Clark et al. . |
| 4,246,918 | 1/1981 | Dean . |
| 4,380,246 | 4/1983 | Casale et al. . |
| 5,072,753 | 12/1991 | Ackroyd . |

FOREIGN PATENT DOCUMENTS

| | | |
|---|---|---|
| 669825A5 | 4/1989 | (CH) . |
| 1675481 | 12/1970 | (DE) . |
| 1750438 | 2/1971 | (DE) . |
| 2427995 | 1/1976 | (DE) . |
| 2511501 | 2/1976 | (DE) . |
| 2648676 | 9/1977 | (DE) . |
| 2943986 | 5/1980 | (DE) . |
| 4305123A1 | 9/1994 | (DE) . |
| 193503 | 9/1986 | (EP) . |
| 424197A1 | 4/1991 | (EP) . |
| 0578373 * | 1/1994 | (EP) ..................................... 123/323 |
| 1231337 | 9/1960 | (FR) . |
| 1374187 | 11/1974 | (GB) . |
| 406241071 * | 8/1994 | (JP) ..................................... 123/323 |
| 667747 | 6/1979 | (RU) . |
| 811029 | 3/1981 | (RU) . |
| 877195 | 11/1981 | (RU) . |

* cited by examiner

Primary Examiner—John Fox
(74) Attorney, Agent, or Firm—Harness, Dickey & Pierce, PLC (57) ABSTRACT

A shut-off or throttle valve comprises a housing defining a flow passage and a valve flap to be pivoted about an axis of rotation extending across the flow cross-section of the valve. The valve flap in its closed position is located in a closing plane containing said axis of rotation and extending transversely to the direction of fluid flow and is spaced at its edges in all positions from the housing such that the respective spacing cannot be overcome by thermal expansions to be expected in operation. The peripheral portions of the valve flap cooperate with abutment edges serving as a front seal. The flap surface is subdivided by the axis of rotation into a pair of sections. Each section has associated therewith an abutment edge extending towards the axis of rotation such that the abutment edges are positioned on opposite sides of the valve flap.

14 Claims, 5 Drawing Sheets

SHUT-OFF OR THROTTLE VALVE WITH PIVOTAL FLAP

This is a continuation-in-part of U. S. patent application Ser. No. 08/737,433, filed Sep. 10, 1996, now U.S. Pat. No. 5,975,128.

FIELD OF THE INVENTION

The invention relates to a shut-off or throttle valve comprising a housing encircling a flow passage and a valve flap pivotally arranged about an axis of rotation extending across the flow cross-section of the valve, in particular for flow passages of combustion engines arranged for loading or discharging exhaust gases, the surface of the valve flap being subdivided into a pair of sections by said axis of rotation.

A valve flap has been known which is inclined with respect to the direction of fluid flow when it is in its closed position in order to avoid jamming caused by thermal expansions and which therefore has an inclined cylinder section so that its peripheral surface sealingly engages the tube wall and, respectively, the wall of the cylindrical valve housing. This measure for preventing jamming is effective only at the peripheral portions which are furthest from the axis of rotation; it is ineffective in the area of the peripheral portions intersecting the axis of rotation because there is no inclination with respect to the tube axis in the direction of the axis. At this location it is necessary to provide a gap to compensate for thermal expansions, and as a result the valve is not sealed there. For providing the complicate shape of the valve flap, the flap has to be ground or milled at its periphery, which on the one hand will cause high machining costs and on the other hand cannot prevent leakage losses through the valve which increase with higher pressures.

Furthermore, it has become known to provide recesses in the internal wall of the valve housing which are engaged by the valve flap portions remote from the axis of rotation when being in the closed position inclined to the direction of fluid flow, further including abutment surfaces facing said valve flap portions, which abutment surfaces are engaged by the valve flap when it is in its closed position. Also with this arrangement, milling operations of the valve housing are required, and the above mentioned leakage losses in the area of the valve flap peripheral portions intersecting the valve axis are also true for this type of valve.

When such a valve is used in the exhaust conduit of a combustion engine provided with an exhaust gas heat exchanger and a catalytic converter in order to conduct the exhaust gas either through the heat exchanger or through a bypass, with the valve being used for closing the bypass, energy is lost by leakage through the bypass valve. Leakage losses of more than 50% are possible.

The problem to be solved by the invention is to design a valve of the above identified type such that it reliably operates at varying temperatures, that it can be manufactured in a simple and cost effective manner and that it can be relatively easily assembled even under limited space conditions. In particular, it should be able to generate a ram pressure of 5 bar in the exhaust conduit of a combustion engine during idling, i.e. at about 500 rpm. Furthermore, the valve should be suited for a flow control, in particular for controlling the ram pressure in a conduit while remaining in a stable position even at small opening angles and under the influence of flow turbulence, or it should be suited to be used as a check valve, having an opening pressure which may be adjusted if desired.

For solving this problem the valve of the above identified type has been designed such that said valve flap when being in the closed position is located in a closing plane which contains said axis of rotation and extends transversely to the flow direction, and further the valve flap is spaced at its edge in all positions along all sides in the plane of the valve flap from the housing at a distance such that this distance cannot be overcome by thermal expansions to be expected in operation, and further that the peripheral portions of the housing include an abutment edge each extending towards the axis of rotation, and that said abutment edges are disposed on different sides of the valve flap and are associated to said valve sections so as to form a face seal.

Such structure does not require any expensive machining of the valve flap or the valve housing; rather a stamped flap and a simple tube material for forming the housing can be used. The spacing between the flap rim and internal wall of the housing all around allows to compensate for thermal expansions without any risk of jamming. Since the flap engages the abutment edges all around without any gaps, excellent sealing thereof is ensured.

In an embodiment which may be used, for example, as a shut-off valve the axis of rotation subdivides the flap surface into a pair of sections having the same size.

When a pivotal flap valve is used, the desired opening position thereof may be set by a servo motor. This type of valve is instable at small opening angles due to flow turbulances. A valve which enables to set the desired ram pressure by a biasing force would be preferable. To this end a preferred embodiment of the valve of the invention is designed such that the axis of rotation subdivides the flap surface into a pair of sections of different sizes and that the greatest dimension of the flap parallel to the axis of rotation is smaller than the width of the flow passage as measured in the same direction.

When the valve is assembled such that the ram pressure acts upon the larger flap section and a biasing force dependent on the flap stroke acts upon the flap in the closing direction, a stable position of the flap may be obtained any time, with the flap in such position maintaining a ram pressure according to the characteristic of the biasing force.

A particularly advantageous embodiment consists in that said housing comprises a tubular sleeve through which said axis of rotation extends, and a pair of tube portions enclosed by said tubular sleeve, the edges of said tube portions facing the valve flap on opposite sides of said axis of rotation serving as abutment edges for the valve flap when it is in its closed position and extending towards the axis of rotation so as to be spaced from the center of rotation for at least half of the wall thickness of the valve flap and extending therebehind outside of the area of pivotal movements of the valve flap. A simple design thereof consists in that the edges of the tube portions facing said valve flap are subdivided by a stepped portion extending parallel to the axis of rotation into a pair of portions offset with respect to each other in the flow direction of the valve, which offset portions each extend in parallel to the plane of the valve flap in its closed position.

This results in a particularly simple and cost effective structure which may be assembled relatively easily even under difficult space conditions because the valve housing may be assembled in situ and the essential part of the valve consists of the tubular sleeve with the valve flap mounted therein. When the adjacent conduit portions have been prepared by respective machining of their ends to be connected to the valve, the only thing necessary is to align these conduit portions for being inserted into the tubular sleeve and fixed thereto.

When the space conditions are particularly limited, a preferred alternative consists in that the abutment edges extend to the axis of rotation so as to be spaced therefrom for half the diameter the axis of rotation, and that the wall thickness of the valve does not exceed the diameter of the axis of rotation. This allows, when the valve flap is in its opening position, to displace the tubular sleeve with the valve flap onto a first tube end until the offset edge portion engages the axis of rotation so that a tube end continuing the conduit on the other side of the valve can be aligned with respect to the sleeve and thereafter the sleeve can be mounted onto such tube end until both tube ends are properly positioned in the sleeve and the sleeve can be connected to the tube ends. In this manner it is possible to mount the valve, without having been disassembled before, into conduits from which a portion has been cut away for assembly and the ends of which have been stepped so as to be conform thereto.

When the axis extends through the flow cross-section, the ram pressure acts on either side of the axis so as to generate opposite torques so that the closing force has to overcome only the difference between both torques. However, this type of valve where a portion of the valve housing is formed by a pair of tube portions which are connected by a sleeve-like element serving to mount the pivotal flap, requires machining of the tube ends. When the axis of rotation extends outside of the flow cross-section, the flap when it is in its closing position could engage only the upstream tube end so that it is sufficient to cut off this tube end so as to form a plane annular surface. However, in this case there will be no pressure balance at the flap so that the closing force has to resist the full ram pressure. This may cause serious problems with a ram pressure of, for example 5 bar, by the space requirement of the closing device.

An embodiment of the invention serves the object to retain the relatively simple structure with a pair of sleeve-like tube portions enclosed by an element mounting the pivotal flap, to ensure an excellent sealing and to limit machining of the tube ends to separating them by a plane cut.

In this embodiment the invention starts from a shut-off or throttle valve including a housing enclosing a flow passage and a valve flap adapted to be pivoted about an axis, in particular for combustion engine flow passages provided for loading or exhaust gas discharging, and an actuating lever connected to said axis outside of the housing. The solution is characterized in that said flow passage is defined within the housing by a pair of coaxially spaced tube portions which are enclosed by a flap housing wherein said valve flap with its axis is arranged such that it covers in its closing position the end of the upstream tube portion which opens into said flap housing and forms a plane annular surface in a closing plane containing the axis of said valve flap and extending transversely to the direction of fluid flow, while the valve flap in its opening position is pivoted away from the flow passage between the two tube portions, that said actuating lever is connected to a piston which is loaded by a biasing force towards its position associated with the closing position of the valve flap and is subjected, in the direction of the biasing force, to gas pressure prevailing in the flow passage upstream of the valve flap, the surface of the piston subjected to gas pressure being slightly smaller than the opening cross-section of the tube portion covered by the valve flap in its closing position, and that the surface can be selectively subjected to a pressure overcoming said biasing force.

In this manner most of the ram pressure at the closed flap which is a laterally mounted flap is compensated by a counterforce derived from the gas pressure so that only a relatively small additional force is required to sealingly close the valve.

An advantageous embodiment consists in that said piston includes a diaphragm separating a pair of chambers of an actuating cylinder, that a push member extending across one of said chambers and projecting therefrom cooperates with said actuating lever and is connected to said piston, and that the chamber across which said push member extends is adapted to be communicated to a pressure source and the other of said chambers communicates with the flow passage upstream of said closing plane; preferably for generating said biasing force, a compression spring in the chamber through which the push member extends is positioned between the piston and the opposite cylinder wall.

An advantageous embodiment consists in that said compression spring is formed as a bellows surrounding said push member and sealingly connected to said piston and said cylinder wall.

A further particularly advantageous embodiment consists in that said biasing force acts upon a lever such that the active lever arm between the line of action of said biasing force and the axis of rotation of said valve flap decreases in response to movement of said valve flap towards its opening position, and that the torque resulting from said biasing force and said active lever arm is digressive. This allows to use the valve as a ram pressure means for increasing the heating power of the engine in operative conditions at low speed and at low power output.

With reference to the following description of the embodiments of the invention shown in the drawing these will be explained in more detail.

Figure 1:
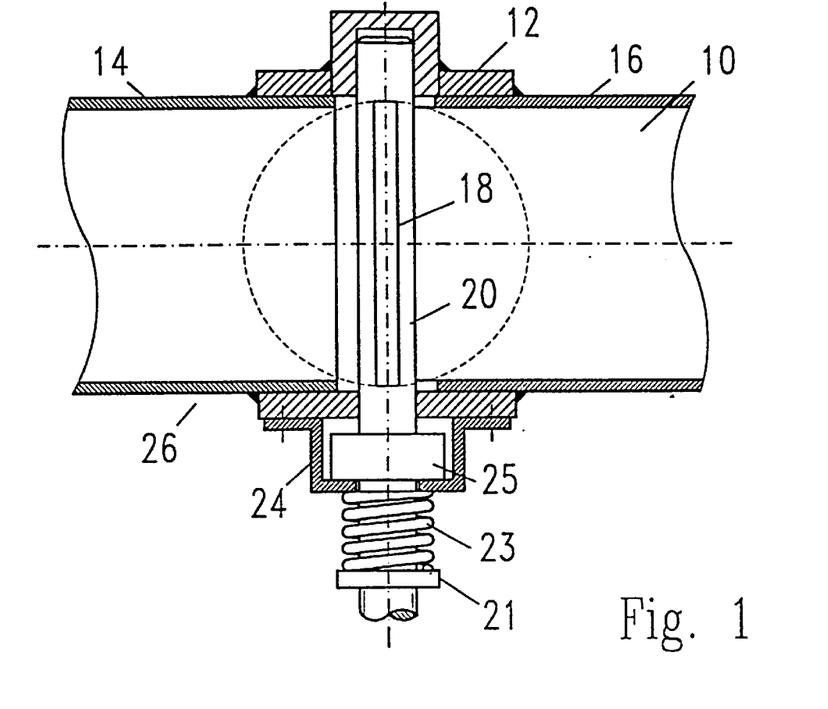
FIG. 1 is a cross-section of a pivotal flap valve according to the invention transverse to the axis of the rotation.
Figure 2:
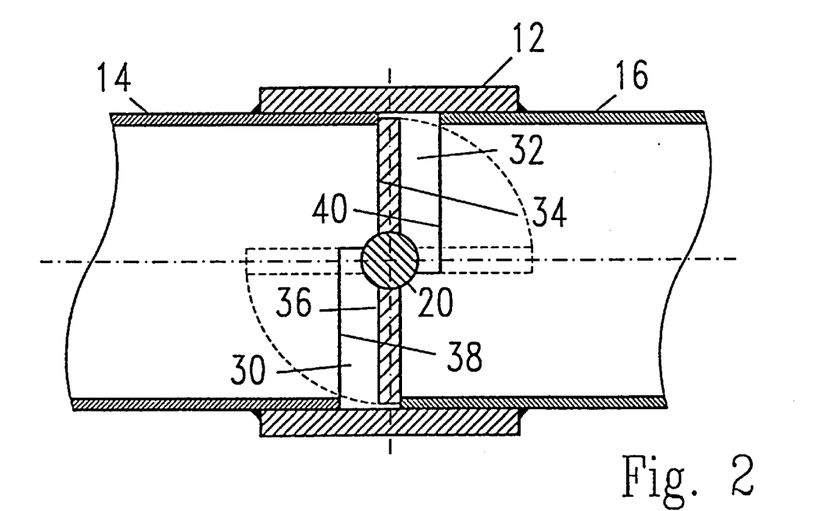
FIG. 2 is a cross-section of the valve in FIG. 1 in the direction of the axis of rotation.

A tubular fluid flow conduit generally designated by 10 and being of a circular cross-section has been separated in the area of a tubular sleeve 12, with the two tube portions 14 and 16 being spaced from each other sufficiently to allow for insertion of a valve flap 18 therebetween. However, the invention may be also utilized with cross-sectional profiles of the flow conduit, in particular with rectangular cross-sections. The valve flap 18 can be a simple stamped piece and is connected to a pivot axis 20 which is mounted in bearings 22 and 24 adjacent sleeve 12 and projects from sleeve 12 on one side so as to be connected to an actuating or controlling mechanism. The tubular sleeve 12 and the tube portions 14 and 16 constitute a valve housing 26.

The portion of pivot axis 20 which projects from sleeve 12 is provided with a land 21 seating a compression spring 23 surrounding the pivot axis, which spring urges a sealing flange 25 tightly against the internal side of bearing 24. The sealing flange 25 is disposed within bearing 24 formed as a removable cap and is integral with axis 20.

The valve flap 18 is spaced from the internal wall of valve housing 26 sufficiently so that the respective spacing allowing for free movements of the valve flap cannot be overcome by dimensional changes to be expected in operation due to thermal expansion.

In the example shown the valve flap 18 in its closed position extends perpendicularly to the direction of fluid flow and to the axis of sleeve 12, and engages the edges of the two tube portions 14 and 16 facing the valve flap. In order to ensure that the valve flap 18 can move to the closed position without interfering with the tube portions 14 and 16, these portions must include recesses 30 and 32, respectively, in the movable range of the valve flap 18. In the example shown the recesses are created by the fact that the edges of tube portions 14 and 16 on either side of pivot axis 20 have portions which serve as abutment edges 34 and 36, respectively, and which portions extend towards the pivot axis 20 while they are spaced from the pivot center for at least half the thickness of valve flap 18 so as to allow for positioning the valve flap 18 to be parallel to the fluid flow direction when the valve is in the opened position. The respective adjacent portions 38 and 40 are offset with respect to abutment edges 34 and 36, respectively, so that there is no interference with the valve flap 18 when pivoting between the closed and open position.

Figure 3:
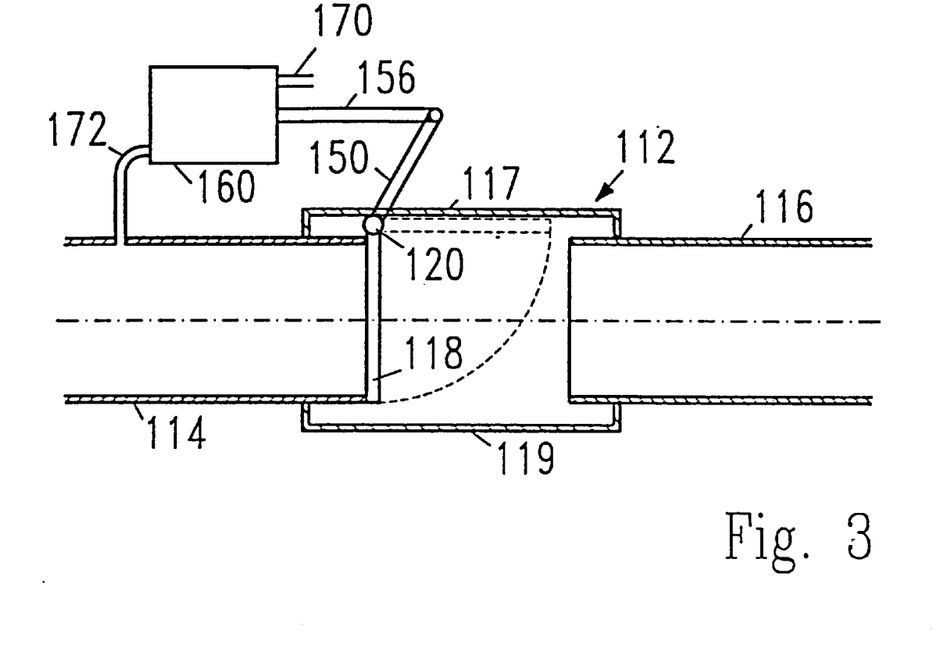
FIG. 3 is a cross-section of an alternative embodiment including a laterally mounted pivotal flap.

In FIG. 3 a flap housing 112 instead of tubular sleeve 12 encloses the two ends of the tube portions 114 and 116 facing each other and each terminating in a plane annular surface. The end of the upstream tube portion 114 is engaged by a valve flap 118 when it is in its closing position, with the pivot axis 120 of the valve flap extending across the flap housing radially outside of the cross-sectional area of tube portions 114 and 116. The flap housing in this area is limited by a surface 117 parallel to axis 120, while the opposite walls 119 of flap housing 112 on this side may be of an arcuate shape concentric to tube portions 114 and 116.

Figure 4:
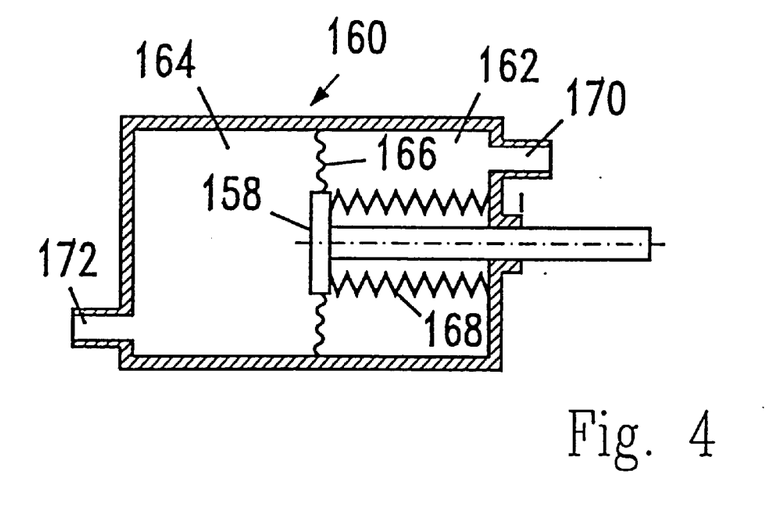
FIG. 4 is an enlarged representation of the device for compensation of the ram pressure.

The pivot axis 120 outside of flap housing 112 is provided with a lever 150 which is engaged by a rod 156 which is secured to a double acting piston 158 movable in a cylinder 160. Piston 158 includes a diaphragm 166 subdividing the cylinder 160 into a pair of chambers 162 and 164. The rod 156 is encircled by a compression spring 168 formed as a bellows which is connected on the one hand to the piston 158 and on the other hand to a cylinder wall through which the rod 156 extends, and which tends to draw the rod 156 into cylinder 160 so as to draw the valve flap 118 to the open position.

Chamber 162 through which rod 156 extends communicates via a conduit 170 with a pressure source; the other chamber 164 communicates via a conduit 172 with the tube portion 114 upstream of the closing plane.

Spring 168 retains valve flap 118 in its open position until chamber 162 has been communicated with vacuum; thereby diaphragm 166 and piston 158 are moved such that the rod 156 extends to pivot the valve flap to is closed position. The ram pressure developing upstream of the closing plane due to the increasing restriction of fluid flow would act in opposition to the force of the vacuum. Since, however, this ram pressure acts via conduit 172 upon piston 158 in the closing direction of the valve, but exerts a somewhat smaller force, due to the smaller surface of the piston 58 as compared to the flow cross-section of tubular portion 114 than the ram pressure acting directly upon the closed valve flap 118, a relatively small vacuum is sufficient to retain the valve flap 118 in the closed position.

Figure 5:
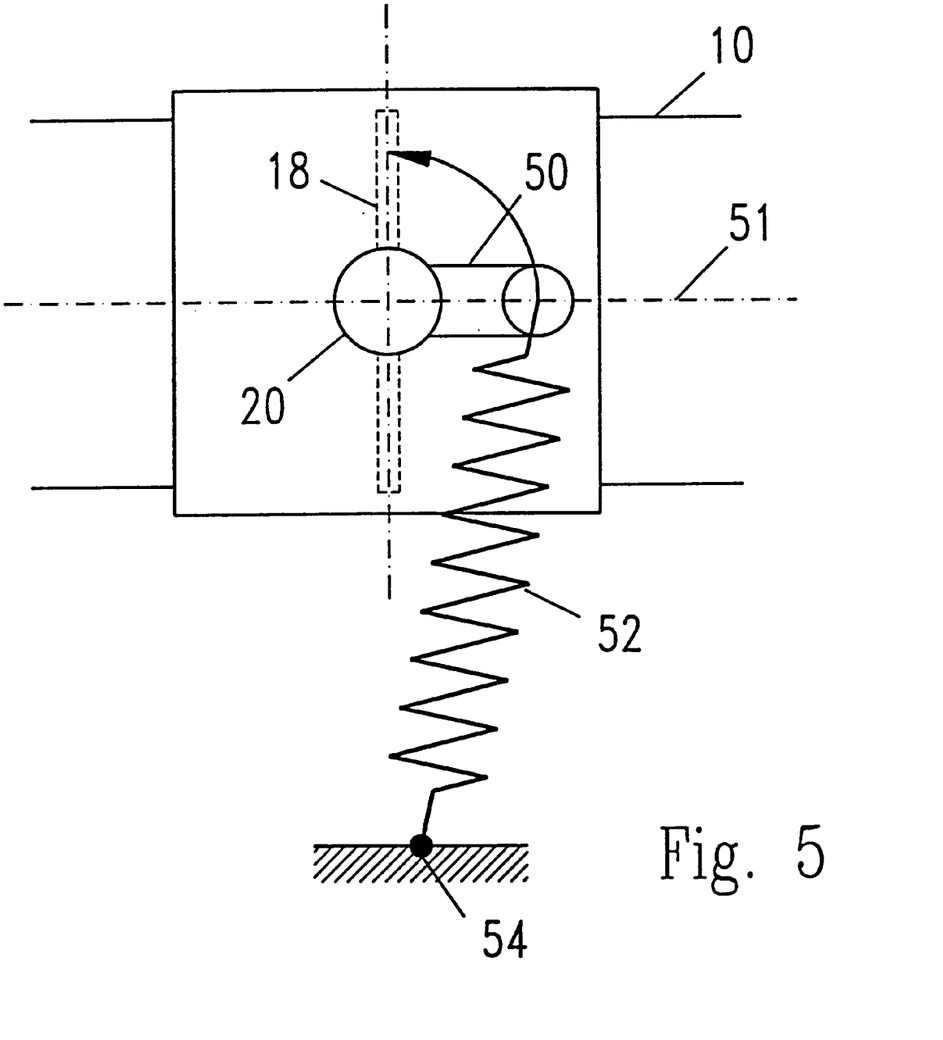
FIG. 5 is an alternative valve designed as a digressively loaded pivotal flap.

FIG. 5 shows schematically a conduit portion 10 accommodating a valve of the invention, which valve has a projecting pivot axis 20. The pivot axis 20 has a bent-off end portion forming a lever arm 50. The end of the lever arm 50 which is more remote from axis 51 of conduit portion 10 than the end of the axis 20 which carries the lever arm 50, is engaged by a spring 52 biasing the valve flap 18 in the closed direction, which spring is supported by a pivot 54. The arrangement is such that the lever arm effective between the pivot axis 20 and the line of action of spring 52 decreases when the valve flap 18 moves to its opened position so that the torque resulting from the spring force and the active lever arm is digressive.

This allows the valve to be used as a pressure ram device in the exhaust gas conduit of combustion engines in order to provide for increased heat delivery of the engine by an exhaust gas ram pressure condition in heat demand situations, with the energy consuming ram pressure being automatically reduced in response to an increasing mass flow.

Figure 6:
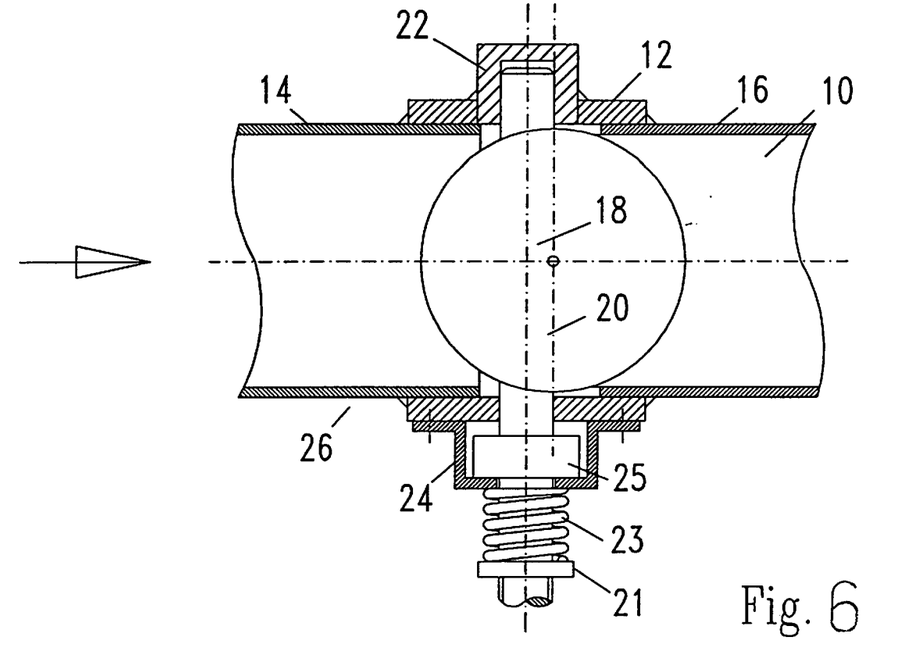
FIG. 6 is a cross-section of a valve to the invention.
Figure 7:
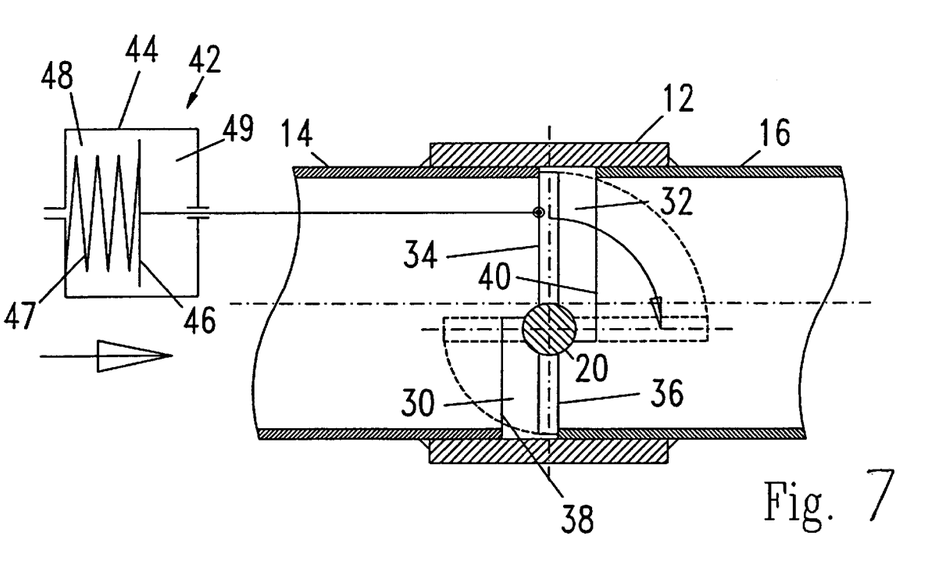
FIG. 7 is a cross-section of the valve in FIG. 1 in the direction of the axis of rotation.

As shown in FIGS. 6 and 7, pivot axis 20 is spaced from the axis portions 14 and 16 such that the valve flap 18 is divided into a pair of plate sections, with one plate section having a larger surface area than the other plate sections. Such plate sections of different sizes are arranged such that fluid flow (shown by the arrow) when the valve flap is in its closed position generates pressure forces tending to urge the valve flap 18 towards its open position. More particularly, ram pressure is generated by valve flap 18 in the exhaust gas conduit upstream of the valve flap, which ram pressure results in torque tending to move valve flap 18 towards its open position.

An actuating means 42 is provided to move valve flap 18 between its open and closed positions. Actuating means 42 comprises a piston cylinder assembly including a cylinder 44 and a piston 46. Piston 46 divides cylinder 44 into work chambers 48 and 49. Chamber 49 permanently communicates with the atmosphere, while work chamber 48 is selectively communicated to vacuum. Furthermore, piston 46 is biases by a compression spring 47 as showing in FIG. 7.

Piston 46 is connected to the valve flap (as indicated only very schematically in FIG. 7) so as to move valve flap 18 between opening and closing positions in response to operation of actuating means 42, i.e. feeding and discharging vacuum to and from work chamber 48.

The valve shown in FIGS. 6 and 7 may be used as a shut-off valve which is moved to its closed position when work chamber 48 is communicated to vacuum and which is moved to its open position either when vacuum is discharged or breaks down or when the pressure difference acting upon valve flap 18 exceeds a predetermined desired value.

Figure 8:
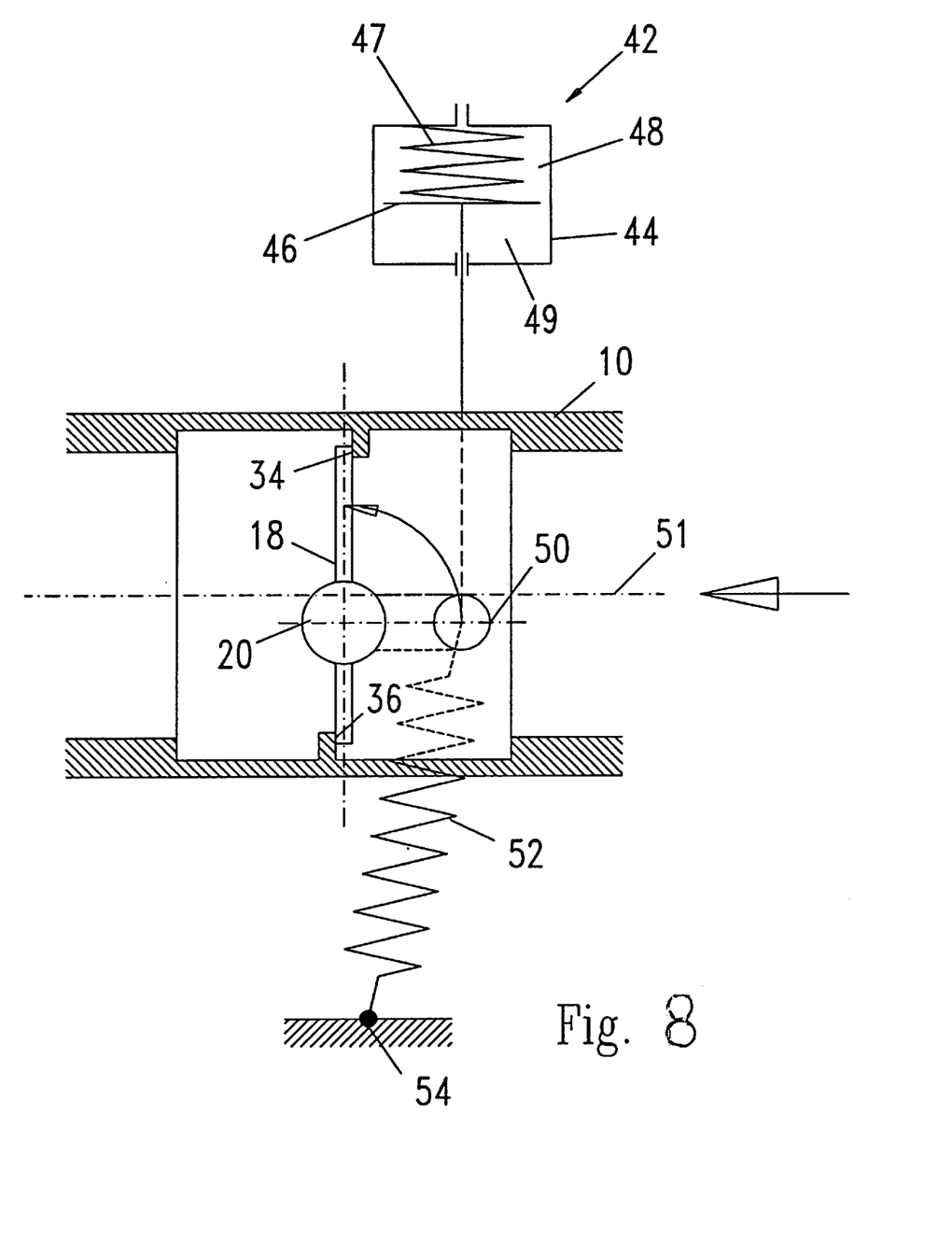
FIG. 8 is a cross-section of an alternative embodiment of a valve according to the invention.

FIG. 8 shows a throttle valve which is basically similar to the shut-off valve of FIGS. 6 and 7 with similar parts having been designated by the same reference numerals. It is to be noted, however, that FIG. 8 has been drawn such that the flow direction in exhaust gas conduit is in FIG. 8 opposite to that in FIGS. 6 and 7.

As shown, pivot axis 20 has an angled end portion forming a lever arm 50. The end of lever arm 50 which is more remote from axis 51 than the end carrying lever arm 50, is engaged by a control spring 52 biasing valve flap 18 towards its closed position. Spring 52 is pivotally mounted to reaction means at pivot 54. The arrangement is such that the lever arm effective between pivot axis 20 and the line of action of spring 52 decreases when valve flap 18 moves towards its open position so that torque resulting from the force of spring 52 is "digressive".

As in FIGS. 6 and 7 actuating means 42 is provided for moving valve flap 18 between open and closed positions. As indicated very schematically piston 46 of actuating means 42 acts upon lever arm 50.

The valve of FIG. 8 may be used as a throttle valve or a ram pressure device in an exhaust gas conduit of an internal combustion engine in order to increase pressure and temperature of the exhaust gas in conditions of heat deficiency. Control spring 52 is operative to automatically reduce ram pressure generated by valve flap 18 when mass flow of the exhaust gas in conduit 10 increases.

What is claimed is:

1. A shut-off or throttle valve for an exhaust gas conduit of an internal combustion engine for generating a ram pressure therein, comprising:

a housing comprising a tubular sleeve and a pair of cylindrical conduit portions of said exhaust gas conduit closed by said tubular sleeve;

a valve flap mounted in said housing so as to be pivotal between open and closed positions, said valve flap comprising an axis of rotation and a flap plate divided by said axis of rotation into a pair of plate sections, said flap plate being disposed in a closing plane extending perpendicularly to a longitudinal axis of said exhaust gas conduit, when said valve flap is in its closed position;

a pair of circumferentially extending abutment edges provided on the housing at opposite sides of said valve flap and facing towards each other such that when the valve flap moves to its closed position one of said plate sections has a peripheral area thereof sealingly engage one of said abutment edges and the other of said plate sections has a peripheral area thereof sealingly engage the other of said abutment edges so as to close said exhaust gas conduit, said conduit portions having end faces facing said valve flap and serving as said abutment edges;

one of said plate sections having a larger surface area than the other of said plate sections and said valve flap being arranged such that ram pressure generated by said valve flap in said exhaust gas conduit exerts upon said valve flap pressure forces resulting in torque tending to move said valve flap towards said open position; and actuating means selectively operable to move said valve flap between and closed positions.

2. A shut-off or throttle valve as defined in claim 1 wherein said actuating means comprises a piston cylinder assembly including a piston having opposite end faces one of which is subjected to atmospheric pressure and the other of which is subjected to vacuum pressure and a resilient force provided by spring means.

3. A shut-off or throttle valve as defined in claim 1 wherein said valve flap is loaded by biasing means providing a biasing torque tending to move the valve flap towards its closed position.

4. A shut-off or throttle valve as defined in claim 3 wherein said biasing means is arranged to provide a biasing torque varying in response to movements of said valve flap.

5. A shut-off or throttle valve as defined in claim 4 wherein said biasing means is connected to said valve flap via a lever having an active lever arm between said axis of rotation of said valve flap and a line of action of said biasing means, said biasing means engaging said valve flap such that said active lever arm decreases in length when said valve flap is moving towards its open position so that said biasing torque provided by said biasing means decreases when the valve flap is moving towards its open position.

6. A shut-off or throttle valve as defined in claim 1 wherein said abutment edges of the housing extend in radial planes each of which is spaced from said closing plane for a distance which does not exceed half the wall thickness of said flap plate.

7. A shut-off or throttle valve as defined in claim 6 wherein said end faces of said conduit portions facing said valve flap each are subdivided by a stepped portion extending parallel to said axis of rotation into a pair of face portions offset with respect to each other in said longitudinal direction of said exhaust gas conduit, said offset portions each extending parallel to said closing plane.

8. A shut-off or throttle valve for an exhaust gas conduit of an internal combustion engine for generating a ram pressure therein, comprising:

a housing comprising a tubular sleeve and a pair of cylindrical conduit portions of said exhaust gas conduit closed by said tubular sleeve;

a valve flap mounted in said housing so as to be pivotal between open and closed positions, said valve flap allowing flow of exhaust gas through said conduit when in said open position, said valve flap prohibiting substantially all flow of exhaust gas through said conduit when in said closed position, said valve flap comprising an axis of rotation and a flap plate divided by said axis of rotation into a pair of plate sections, said flap plate being disposed in a closing plane extending transversely to a longitudinal axis of said exhaust gas conduit, when said valve flap is in its closed position;

a pair of abutment edges provided on the housing at opposite sides of said valve flap and facing towards each other such that when the valve flap moves to its closed position one of said plate sections has a peripheral area thereof sealingly engage one of said abutment edges and the other of said plate sections has a peripheral area thereof sealingly engage the other of said abutment edges so as to close said exhaust gas conduit, said conduit portions having end faces facing said valve flap and serving as said abutment edges;

one of said plate sections having a larger surface area than the other of said plate sections and said valve flap being arranged such that ram pressure generated by said valve flap in said exhaust gas conduit exerts upon said valve flap pressure forces resulting in torque tending to move said valve flap towards said open position; and actuating means selectively operable to move said valve flap between open and closed positions.

9. A shut-off or throttle valve as defined in claim 8 wherein said actuating means comprises a piston cylinder assembly including a piston having opposite end faces one of which is subjected to atmospheric pressure and the other of which is subjected to vacuum pressure and a resilient force provided by spring means.

10. A shut-off or throttle valve as defined in claim 8 wherein said valve flap is loaded by biasing means providing a biasing torque tending to move the valve flap towards its closed position.

11. A shut-off or throttle valve as defined in claim 10 wherein said biasing means is arranged to provide a biasing torque varying in response to movements of said valve flap.

12. A shut-off or throttle valve as defined in claim 11 wherein said biasing means is connected to said valve flap via a lever having an active lever arm between said axis of rotation of said valve flap and a line of action of said biasing means, said biasing means engaging said valve flap such that said active lever arm decreases in length when said valve flap is moving towards its open position so that said biasing torque provided by said biasing means decreases when the valve flap is moving towards its open position.

13. A shut-off or throttle valve as defined in claim 8 wherein said abutment edges of the housing extend in radial planes each of which is spaced from said closing plane for a distance which does not exceed half the wall thickness of said flap plate.

14. A shut-off or throttle valve as defined in claim 13 wherein said end faces of said conduit portions facing said valve flap each are subdivided by a stepped portion extending parallel to said axis of rotation into a pair of face portions offset with respect to each other in said longitudinal direction of said exhaust gas conduit, said offset portions each extending parallel to said closing plane.

* * * * *

UNITED STATES PATENT AND TRADEMARK OFFICE
CERTIFICATE OF CORRECTION

PATENT NO.    : 6,193,214 B1
DATED         : February 27, 2001
INVENTOR(S)   : Oskar Schatz It is certified that error appears in the above-identified patent and that said Letters Patent is hereby corrected as shown below:

<u>Title page,</u>
Item [73], Assignee, should be -- Schatz Thermo Gastech GmbH --

Signed and Sealed this

Twenty-ninth Day of April, 2003

JAMES E. ROGAN
*Director of the United States Patent and Trademark Office*